United States Patent
Lo et al.

(10) Patent No.: US 9,363,123 B2
(45) Date of Patent: Jun. 7, 2016

(54) METHODS AND APPARATUS FOR SIGNAL CONDITIONING IN OFDMA SYSTEMS

(75) Inventors: Titus Lo, Bellevue, WA (US); Xiaodong Li, Bellevue, WA (US)

(73) Assignee: Neocific, Inc., Bellevue, WA (US)

( * ) Notice: Subject to any disclaimer, the term of this patent is extended or adjusted under 35 U.S.C. 154(b) by 1085 days.

(21) Appl. No.: 13/413,894

(22) Filed: Mar. 7, 2012

(65) Prior Publication Data

US 2013/0201814 A1 Aug. 8, 2013

Related U.S. Application Data

(60) Provisional application No. 61/595,551, filed on Feb. 6, 2012.

(51) Int. Cl.
*H04J 11/00* (2006.01)
*H04L 27/26* (2006.01)

(52) U.S. Cl.
CPC .................................. *H04L 27/2624* (2013.01)

(58) Field of Classification Search
CPC ...... H04L 27/2624; H03F 3/19; H03F 1/3247
See application file for complete search history.

(56) References Cited

U.S. PATENT DOCUMENTS

| | | | |
|---|---|---|---|
| 2007/0089015 A1* | 4/2007 | Saul | 714/746 |
| 2009/0092195 A1* | 4/2009 | Guo et al. | 375/260 |
| 2010/0097923 A1* | 4/2010 | Zhao et al. | 370/210 |
| 2011/0092173 A1* | 4/2011 | McCallister et al. | 455/108 |

* cited by examiner

*Primary Examiner* — Ayaz Sheikh
*Assistant Examiner* — Hai-Chang Hsiung
(74) *Attorney, Agent, or Firm* — Baker & Hostetler LLP

(57) ABSTRACT

Methods and systems for conditioning an orthogonal frequency division multiplex (OFDM) signal are disclosed. The OFDM signal may be conditioned prior to transmission by a transmitter in an orthogonal frequency division multiple access (OFDMA) system operating on a channel with a plurality of subcarriers grouped into subchannels. The OFDM signal may be clipped based on a desired peak-to-average-power ratio (PAPR) to produce a clipped-off portion of the OFDM signal. The clipped-off portion of the OFDM signal may be transformed into the frequency domain to produce a frequency-domain signal. An in-band spectral shaping mask may be applied to subcarriers or subchannels of the frequency-domain signal within the channel to control the levels of distortion on the individual subcarriers or subchannels. The shaped frequency-domain signal is transformed into the time domain to produce a time-domain signal. A conditioned signal is produced for transmission by subtracting the time-domain signal from the OFDM signal.

23 Claims, 10 Drawing Sheets

METHODS AND APPARATUS FOR SIGNAL CONDITIONING IN OFDMA SYSTEMS

CROSS REFERENCE TO RELATED APPLICATIONS

This application claims benefit under 35 U.S.C. §119(e) of Provisional U.S. Patent Application No. 61/595,551, filed Feb. 6, 2012, the contents of which is incorporated herein by reference in its entirety.

TECHNICAL FIELD

The disclosed embodiments relate, in general, to Orthogonal Frequency-Division Multiplexing (OFDM)/Orthogonal Frequency-Division Multiple Access (OFDMA) communication systems and, in particular, to signal processing for conditioning signals to be transmitted to increase transmission efficiency in an OFDMA communications system.

BACKGROUND

In a multi-carrier communication system such as an Orthogonal Frequency Division Multiple Access (OFDMA) system, the communicated signal consists of multiple subcarriers (also termed "tones") that are transformed through a certain type of linear transformation (e.g., an inverse Fourier transform) into time signals. One of the distinctive characteristics of a multi-carrier signal in the time domain is that its peak-to-average-power ratio (PAPR) is undesirably high. To transmit a high-PAPR signal without significantly distorting its integrity, the transmitter circuitry has to operate in a linear region, which is normally realized by ensuring the average output signal level of the power amplifier (PA) lower than the PA's 1-dB compression point by a large amount, a process called "back-off". There are some drawbacks for back-off. For example, the PA operates at a low efficiency, thereby consuming a significant amount of power. This is especially undesirable for a device that has a limited power supply.

To increase the transmission efficiency, thereby lowering the power consumption, one has to address the root of the problem, which is the high level of PAPR.

SUMMARY

In accordance with various embodiments of the present invention, methods and systems for conditioning an orthogonal frequency division multiplex (OFDM) signal are disclosed. The OFDM signal may be conditioned prior to transmission by a transmitter in an orthogonal frequency division multiple access (OFDMA) system operating on a channel with a plurality of subcarriers grouped into subchannels. A truncated version of the OFDM signal may be generated by truncating peaks in the OFDM signal in the time domain based on a desired peak-to-average-power ratio (PAPR). The truncated version of the OFDM signal may be transformed into the frequency domain. An in-band spectral shaping mask may be applied to subcarriers within the channel to control the level of in-band spectral regrowth in said truncated version of said OFDM signal. The shaped frequency-domain OFDM signal may be transformed into the time domain to produce a conditioned signal for transmission.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The present invention will be thoroughly understood from the detailed description given below and from the accompanying drawings of various embodiments of the invention, which, however, should not be taken to limit the invention to the specific embodiments, but are for explanation and understanding only.

DETAILED DESCRIPTION OF ILLUSTRATIVE EMBODIMENTS

Figure 1:
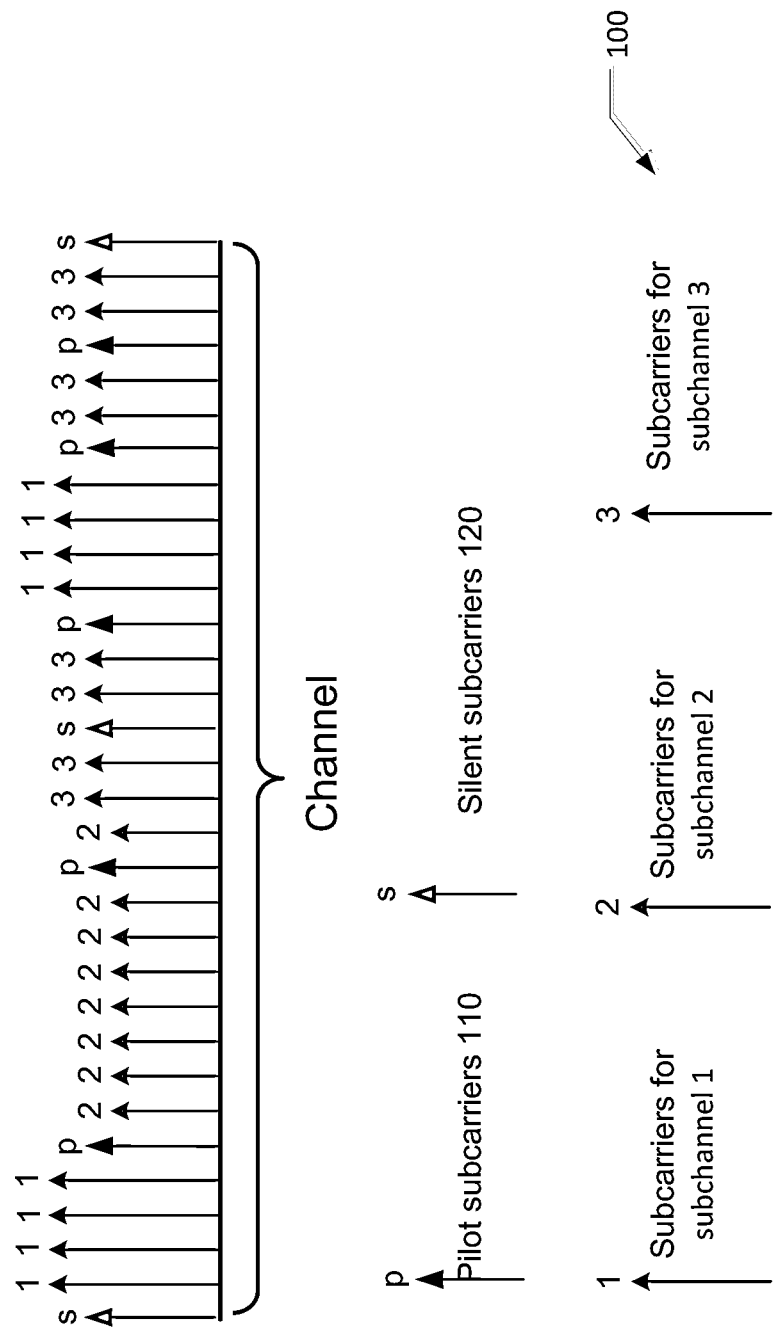
FIG. 1 is a graphical depiction of coded subcarriers.

Methods and apparatus for conditioning the signal to be transmitted in an OFDM/OFDMA communication system are disclosed. Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

In some embodiments of this disclosure, a signal conditioner is inserted in between the IFFT and the radio transmitter. The signal conditioner is controlled by the media access control (MAC) layer. The signal conditioner consists of the necessary linear or nonlinear components to carry out the required functions. The control information to the signal conditioner can be supplied by the MAC layer or by other means.

In some embodiments, multiple signal conditioners may be used in systems with multiple transmitters/antennas.

In some embodiments, the spectral shaping mask can be set to control the level of spectral regrowth for each individual subcarrier. The allowable levels of spectral regrowth at the subcarriers are determined based on the attributes associated with the subcarriers, the mobile stations (MS's), and/or the system.

The following discussion contemplates the application of the disclosed technology to a multi-carrier system, such as Orthogonal Frequency Division Multiplexing (OFDM), Orthogonal Frequency Division Multiple Access (OFDMA), or Multi-Carrier Code Division Multiple Access (MC-CDMA). The invention can be applied to either Time Division Duplexing (TDD) or Frequency Division Duplexing (FDD). Without loss of generality, OFDMA is therefore only used as an example to illustrate the present technology.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

OFDMA Transmission

In a wireless communication system with base stations (BS's) and mobile stations (MS's), the transmission from a BS to a MS is called a downlink (DL) transmission and the transmission from a mobile device to a base station is called an uplink (UL) transmission.

FIG. 1 is a signal diagram depicting the various subcarriers and subchannels that are contained within a given channel. There are three types of subcarriers: (1) data subcarriers 100, which carry information data; (2) pilot subcarriers 110, whose phases and amplitudes are predetermined and made known to all receivers, and which are used for assisting system functions such as estimation of system parameters; and (3) silent subcarriers 120, which have no energy and are used for guard bands and as a DC carrier. The data subcarriers can be arranged into groups called subchannels to support scalability and multiple-access. The subcarriers forming one subchannel may or may not be adjacent to each other. Each MS may use some or all of the subchannels.

Figure 2:
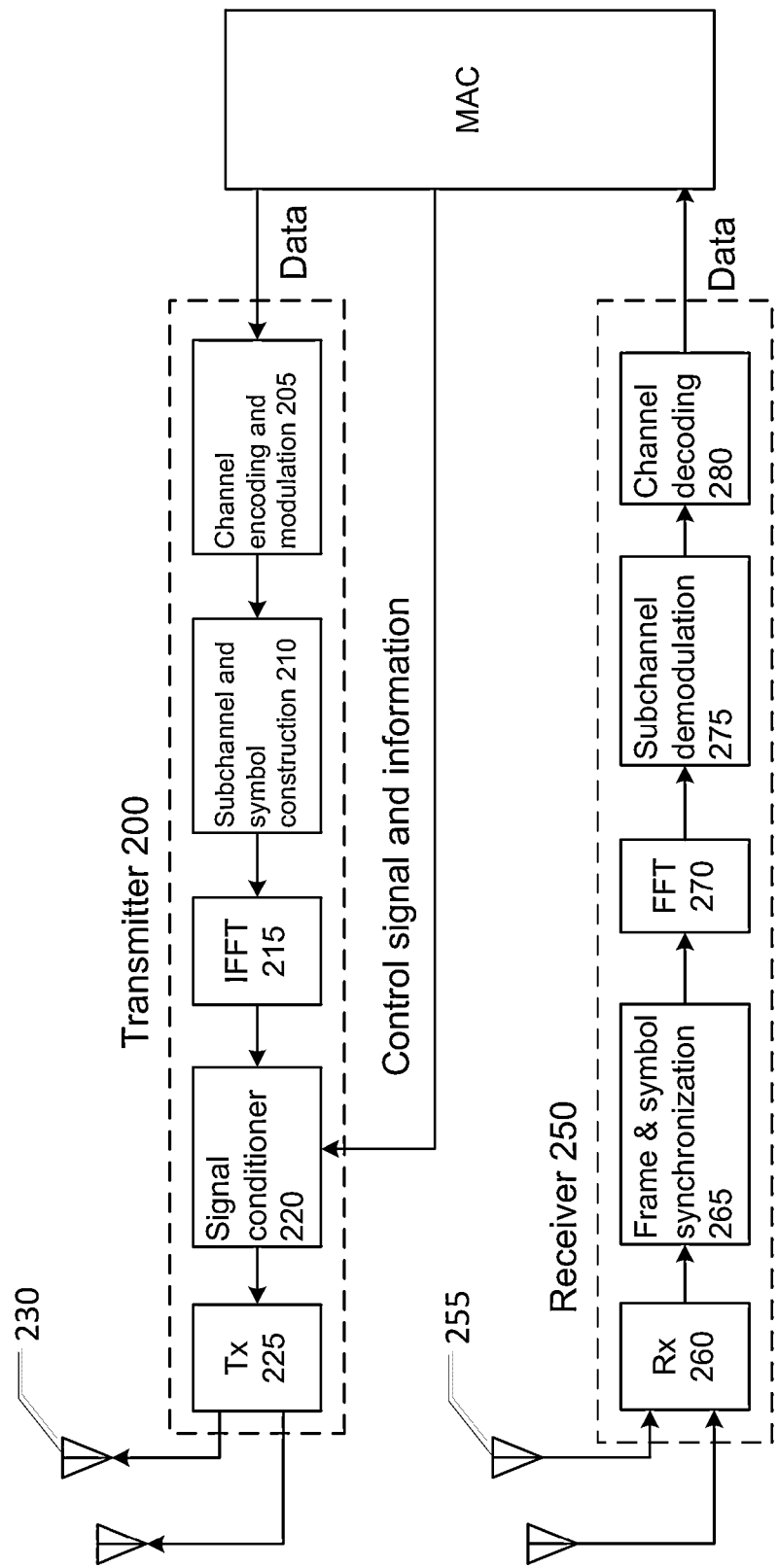
FIG. 2 is a block diagram of a transmitter and receiver, such as might be used in a multi-carrier wireless communication network.

FIG. 2 is a block diagram of a representative transmitter 200 and receiver 250 that may be used in MS's to implement a wireless communication link. The receiver processes the signals from its serving BS, and decodes and extracts the control information and data contained in the signals. The control information may be delivered from a BS to its MS's via a header, preamble, a control channel, data message, or any subdivision of frequency-time resource allocated for the delivery of control information. The control information, which can be decoded at the physical (PHY) layer or the media-access-control (MAC) layer, may include such information as 1. Subcarriers attributes (e.g., their locations and permutations);
2. Subchannel attributes for both DL and UL (e.g., their allocation, mapping patterns, modulation and coding schemes, connection identification);
3. Pilot subcarrier attributes (e.g., common, cell-specific, locations, power level);
4. Information on MS's (e.g., their locations, channel quality indication with respect to the BS);
5. Specific instructions to an MS or a group of MS's to control their transmission attributes (e.g., power, spectral masks);
6. other information.

The transmitter comprises a channel encoding and modulation component 205, which applies data bit randomization, forward error correction (FEC) encoding, interleaving, and modulation to an input data signal. The channel encoding and modulation component is coupled to a subchannel and symbol construction component 210, an inverse fast Fourier transform (IFFT) component 215, a signal conditioner component 220, a radio transmitter component 225, and an antenna 230. Those skilled in the art will appreciate that these components construct and transmit a communication signal containing the data that is input to the transmitter. Other forms of transmitters may, of course, be used depending on the requirements of the communication network.

The receiver 250 comprises an antenna 255, a reception component 260, a frame and symbol synchronization component 265, a fast Fourier transform component 270, a subchannel demodulation component 275, and a channel decoding component 280. The channel decoding component de-interleaves, decodes, and derandomizes a signal that is received by the receiver. The receiver recovers data from the signal and outputs the data for use by the mobile device or base station. Other forms of receivers may, of course, be used depending on the requirements of the communication network.

To deal with the high level of PAPR in an OFDMA signal, the peaks in the time domain are often clipped to a certain level. The effect of clipping is that the unwanted energy or distortion will emerge within and without the bandwidth in the frequency domain (i.e., in-band distortion and out-of-band spectral regrowth). Filtering can be applied to suppress the out-of-band regrowth to meet the transmission spectral mask. The in-band distortion, however, degrades the SNR of all the subcarriers or subchannels used by the MS and other MS's.

Signal Conditioning Before Transmission

In some embodiments in this invention, a signal conditioner may be inserted between the IFFT and the radio transmitter. The signal conditioner may be controlled by the MAC. The signal conditioner may consist of transformers, filters, adders, truncating devices, buffers, delays, and other linear or nonlinear devices. In an embodiment, the information such as the desired PAPR level and spectral shaping requirement is an input to the signal conditioner. The information can be supplied by the MAC layer or by other means.

In the UL transmission in an OFDMA system, an MS is often allocated a fraction of the total subchannels to use. In these cases, this partial usage of bandwidth by an MS can be exploited to condition the signals to be transmitted to increase the transmission efficiency.

In some embodiments, the signal conditioner of an MS limits the PAPR of the signal to be transmitted by clipping (or truncating) the peaks in the time domain while controlling the level of spectral regrowth of the frequency-domain signal by spectral shaping. In the clipping process, a limiting threshold A is used to limit the amplitude of a signal $s(t)=|s(t)|e^{j\phi(t)}$ to meet a PAPR requirement. Without changing the phase of the signal, the amplitude of the signal at time t is limited such that $$|\bar{s}(t)| = \begin{cases} |s(t)| & \text{if } |s(t)| < A \\ A & \text{if } |s(t)| \geq A \end{cases}$$

where $\bar{s}(t)=|\bar{s}(t)|e^{j\phi(t)}$ denotes the clipped signal. The portion that is clipped off from the signal is denoted by $\hat{s}(t)=|\hat{s}(t)|e^{j\phi(t)}$ the amplitude of which is given by $$|\hat{s}(t)| = \begin{cases} 0 & \text{if } |s(t)| < A \\ |s(t)| - A & \text{if } |s(t)| \geq A \end{cases}$$

That is, the clipped signal and the clipped-off portion of the signal are related by $|s(t)|=|\bar{s}(t)|+|\hat{s}(t)|$ and $s(t)=\bar{s}(t)+\hat{s}(t)=|\bar{s}(t)|e^{j\phi(t)}+|\hat{s}(t)|e^{j\phi(t)}$.

Figure 3:
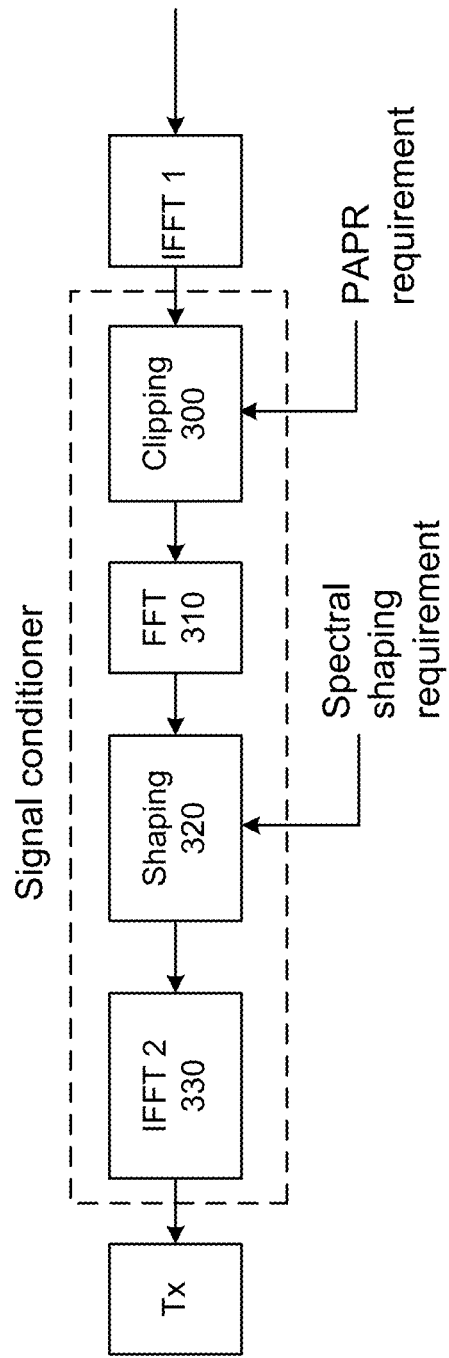
FIG. 3 is a block diagram of an embodiment of the signal conditioner.

The signal-conditioning process is as follows, as shown in FIG. 3:
1. Truncating (300) any peak in the time-domain signal that exceeds the required level to the required level (after IFFT 1)
2. Transforming (310) the truncated signal back to the frequency domain (FFT);
3. Applying (32) the spectral shaping mask; and
4. Transforming the shaped signal back to the time-domain for transmission via IFFT 2 (330).

Figure 4:
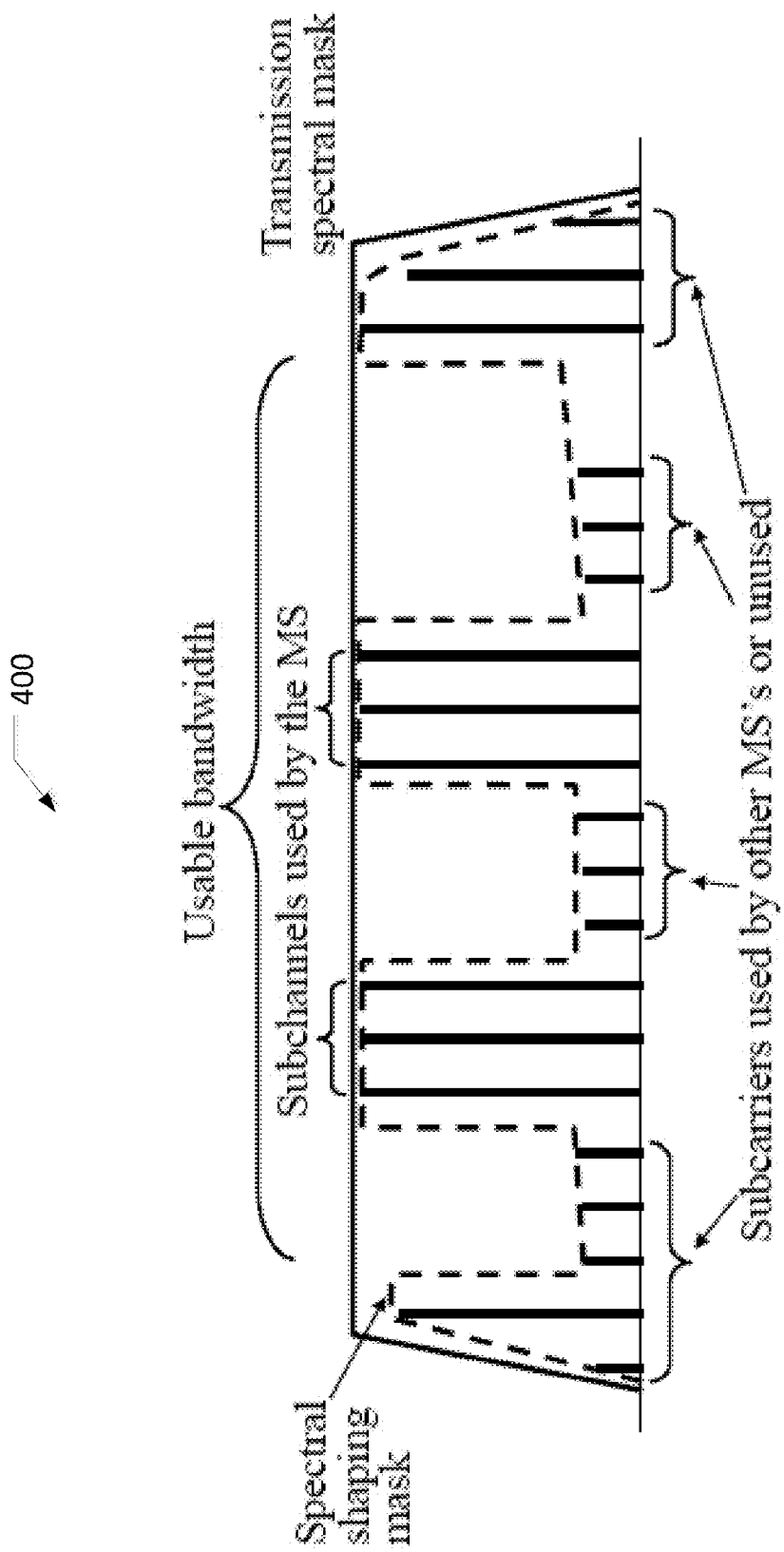
FIG. 4 is a graphical depiction of the application of the spectral shaping mask for the embodiment shown in FIG. 3.

Control information may be supplied to the truncation module and the shaping module from the MAC layer or otherwise. The spectral shaping mask 400, as depicted in FIG. 4, may be designed to
1. meet the transmission spectral requirement (i.e., out-of-band requirement)
2. exert little or no limit over the subchannels used by the MS,
3. have a specified in-band shape to control the spectral-regrowth levels for the subcarriers used by other MS's or unused subcarriers (i.e., in-band requirements).

In effect, the in-band spectral shaping can be applied to individual subcarriers or subchannels, with different requirements for different subcarriers or subchannels.

Figure 5:
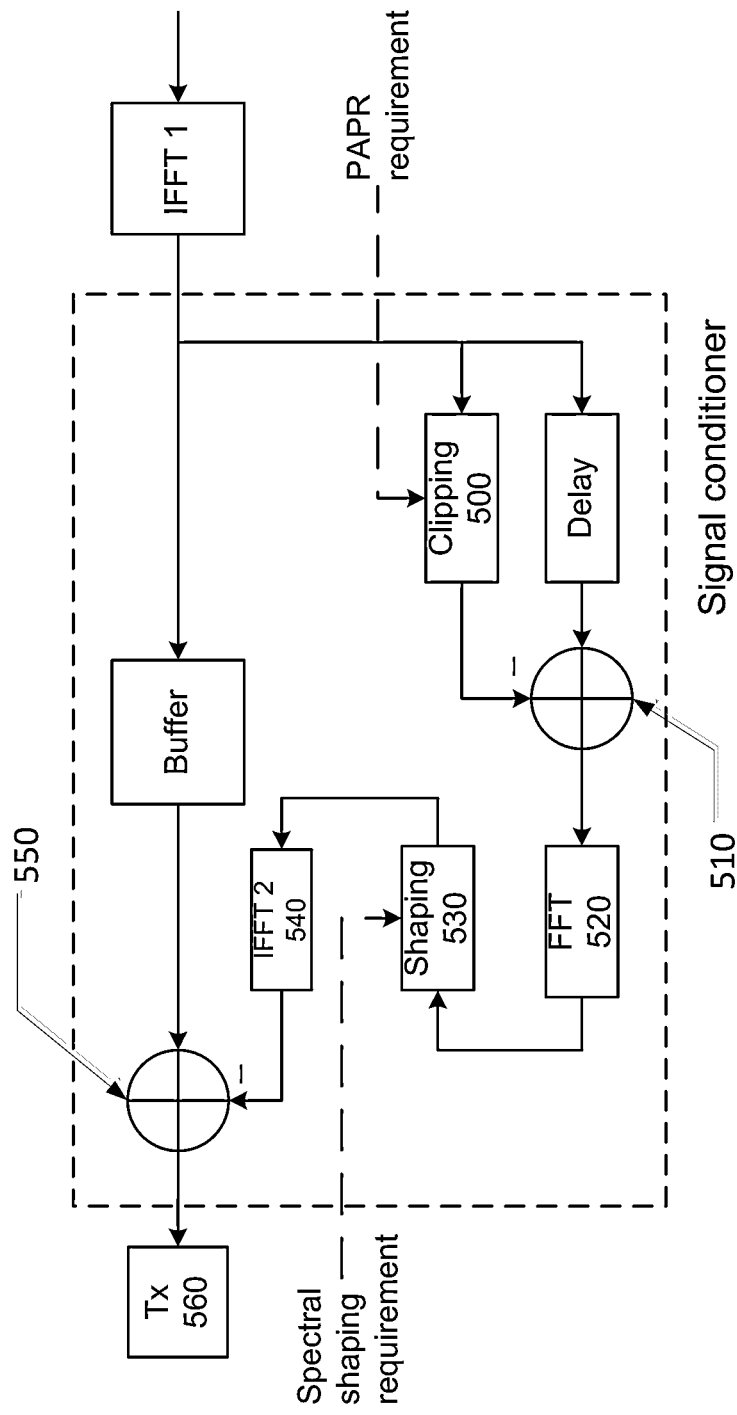
FIG. 5 is a block diagram of another embodiment of the signal conditioner.

In some embodiments, the signal conditioner carries out the signal-conditioning process to exert control over the spectral regrowth in all subcarriers. The process, as shown in FIG. 5, is as follows:

1. Truncating (500) any peak in the time-domain signal that exceeds the required level to the required level (after IFFT 1);
2. Subtracting (510) the truncated signal from the delayed original signal;
3. Transforming (520) the difference to the frequency domain (FFT);
4. Applying (530) the spectral shaping mask;
5. Transforming (540) the shaped signal back to the time-domain (IFFT 2);
6. Subtracting (550) the transformed time-domain signal from the original signal from the buffer.

The result is input to the transmitter (560) for transmission.

Figure 6:
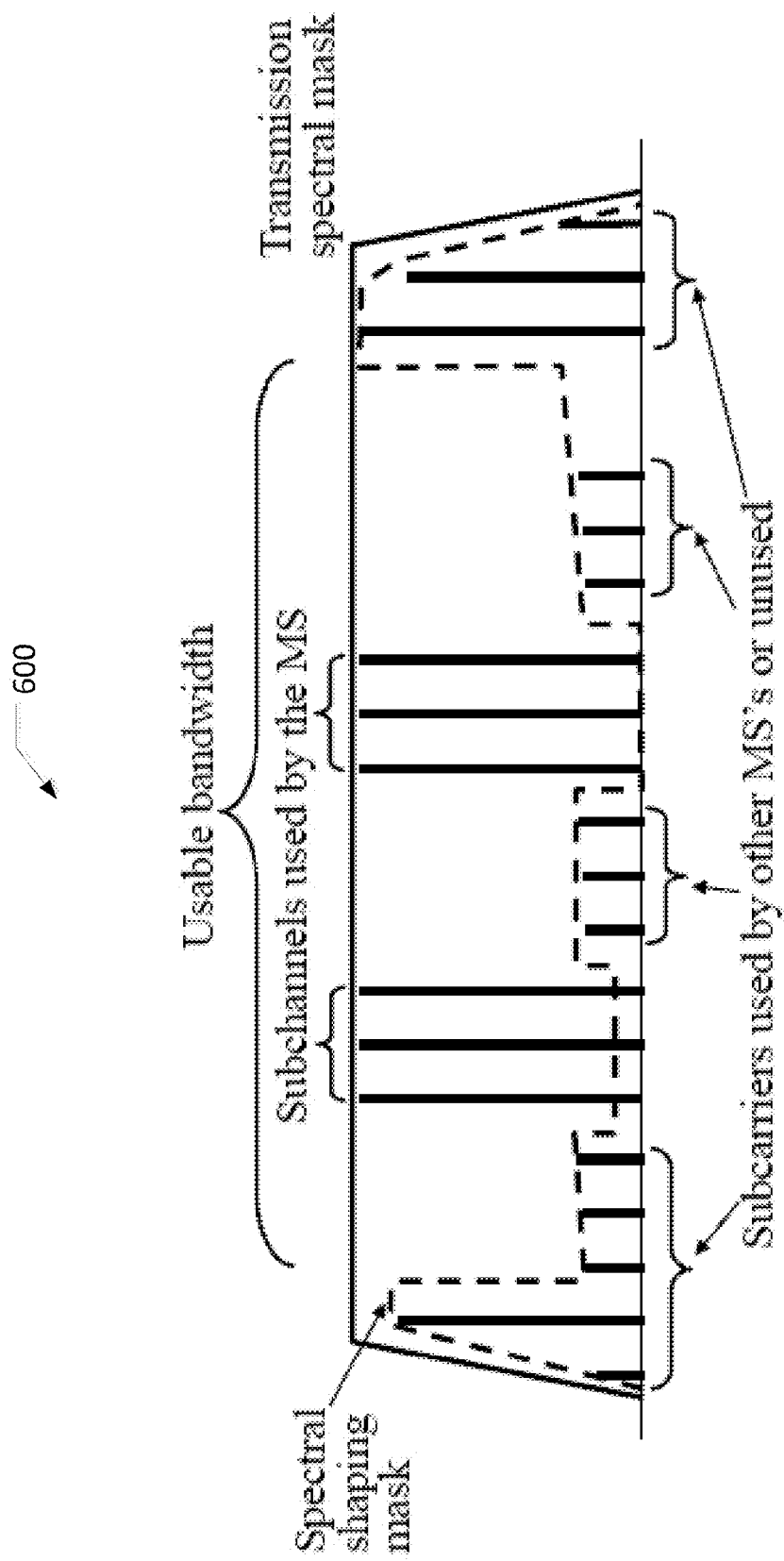
FIG. 6 is a graphical depiction of the application of the spectral shaping mask for the embodiment shown in FIG. 5.

Relevant information may be supplied to the truncation module and the shaping module from the MAC layer or otherwise. The spectral shaping mask 600, as depicted in FIG. 6, may be designed to
1. meet the transmission spectral requirement (i.e., out-of-band requirement)
2. have a specified in-band shape to control the spectral-regrowth levels in all the subcarriers, including those used by the MS, those used by other MS's, and those that are unused (i.e., in-band requirements).

Figure 7:
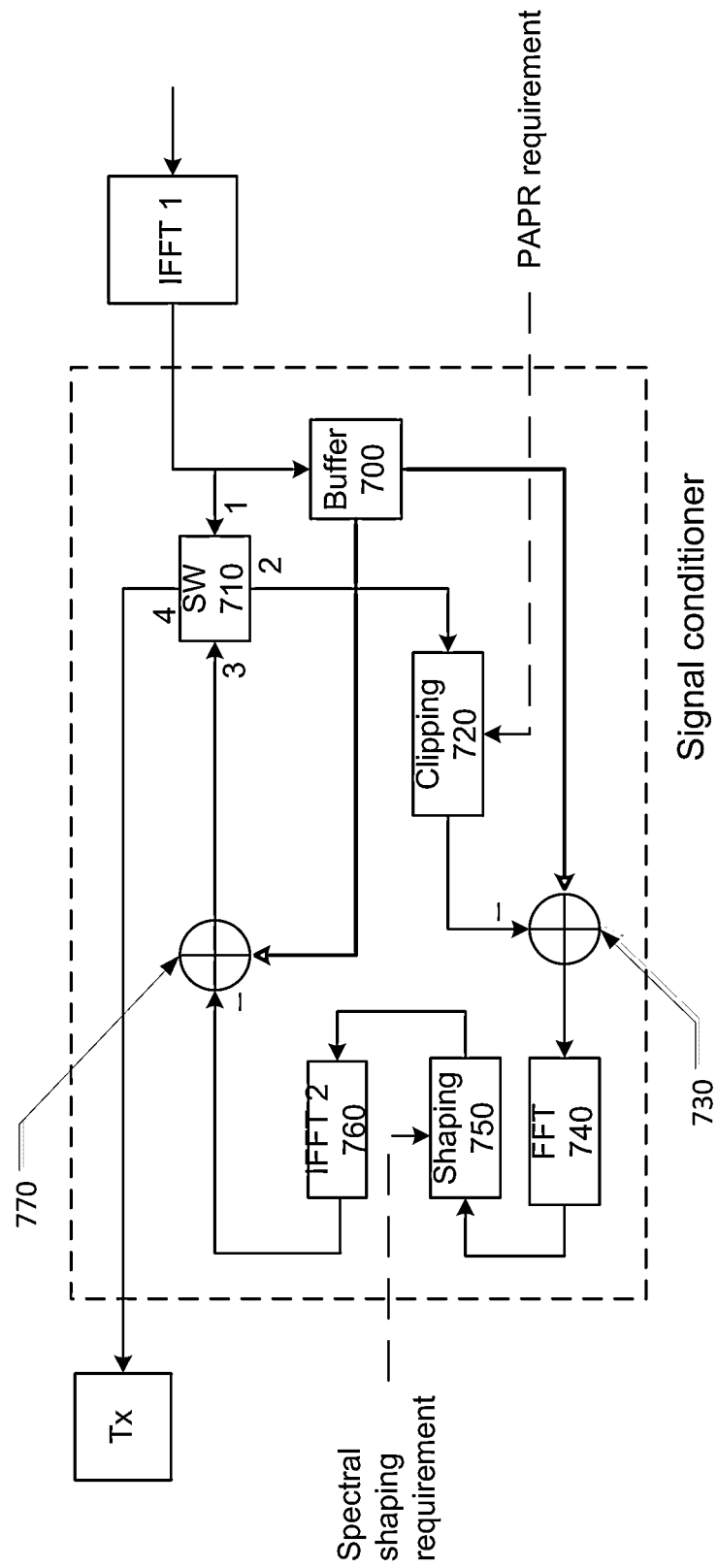
FIG. 7 is a block diagram of an embodiment of the signal conditioner with an iterative loop.

In an embodiment, the signal conditioner may be configured with additional components to implement an iterative loop to enhance the signal-conditioning process, as shown in FIG. 7:
1. Storing the original signal in the buffer (700);
2. Enabling Path 1-2 of the Switch (SW) 710;
3. Truncating (720) any peak in the time-domain signal that exceeds the required level to the required level;
4. Subtracting (730) the truncated signal from the original signal from the buffer;
5. Transforming (740) the difference to the frequency domain (FFT);
6. Applying (750) the spectral shaping mask;
7. Transforming the shaped signal back to the time-domain (IFFT 2) (760);
8. Subtracting (770) the transformed time-domain signal from the original signal from the buffer;
9. Enabling Path 3-2 of Switch (SW) if an additional iteration is required and repeating Steps 3 through 8;
10. Enabling Path 3-4 of Switch (SW) if no more iteration is needed and forwarding the signal to the transmitter for transmission.

Whether an additional iteration is required is determined by whether the resulting signal at Step 8 meets the required PAPR; that is, if the PAPR requirement is met, no additional iteration is necessary; otherwise, an additional iteration is required. Furthermore, the number of iterations can be limited to a specified number.

Figure 8:
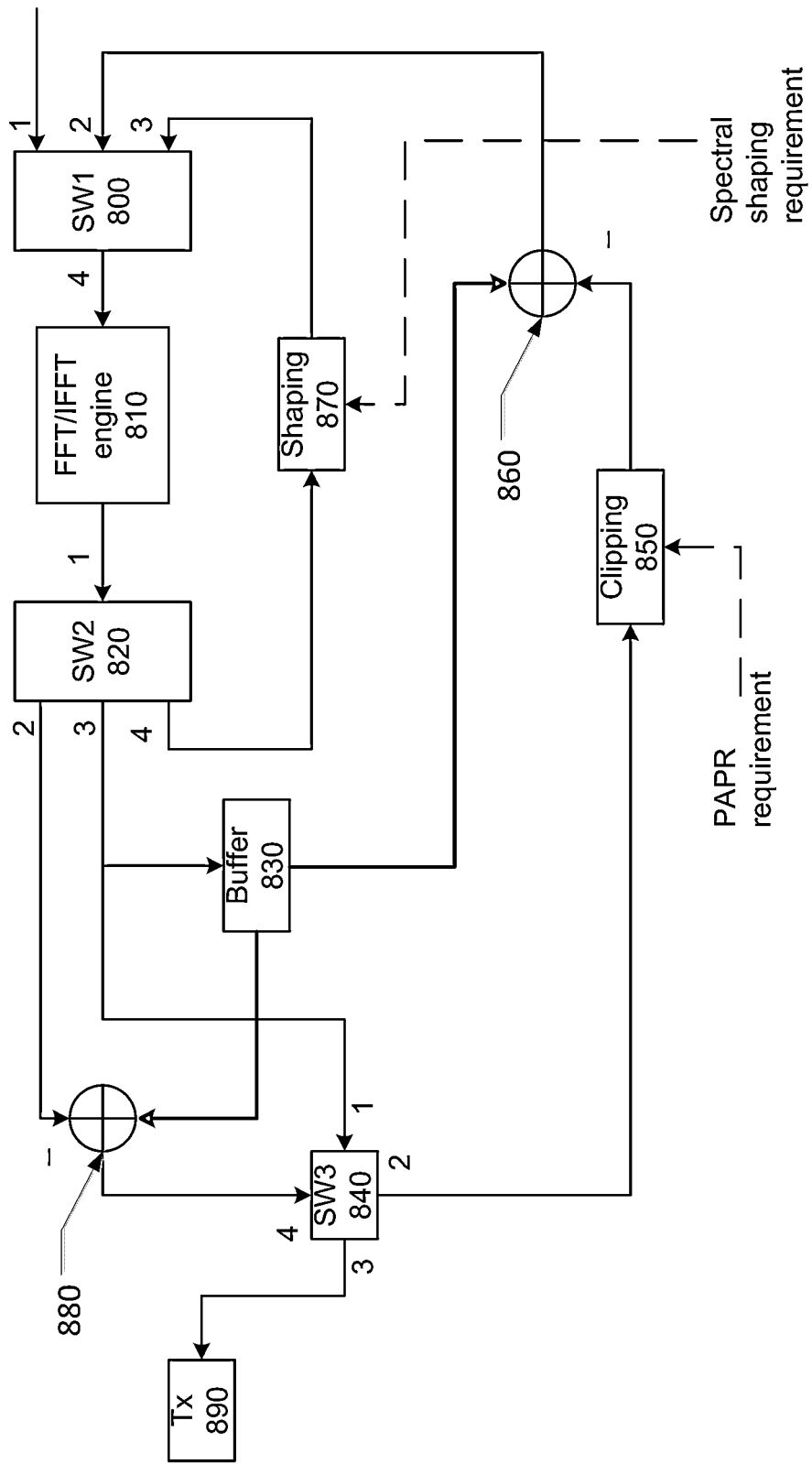
FIG. 8 is a block diagram of an embodiment of the signal conditioner where only one FFT/IFFT engine is used.

In another embodiment, the signal conditioner may be configured that only one FFT/IFFT engine is needed, as shown in FIG. 8. The process is as follows:
1. Enabling Path 1-4 of Switch (SW1) (800);
2. Transforming (810) the signal to the time domain;
3. Enabling Path 1-3 of Switch (SW2) (820);
4. Storing the original signal in the buffer (830);
5. Enabling Path 1-2 of Switch (SW3) (840);
6. Truncating (850) any peak in the time-domain signal that exceeds the required level to the required level;
7. Subtracting (860) the truncated signal from the original signal from the buffer;
8. Enabling Path 2-4 of Switch (SW1) (800);
9. Transforming (810) the difference to the frequency domain;
10. Enabling Path 1-4 of Switch (SW2) (820);

11. Applying the spectral shaping mask (870);
12. Enabling Path 3-4 of Switch (SW1) (800);
13. Transforming (810) the shaped signal back to the time-domain;
14. Enabling Path 1-2 of Switch (SW2) (820);
15. Subtracting (880) the transformed time-domain signal from the original signal from the buffer;
16. Enabling Path 4-2 of Switch (SW3) (840) if an additional iteration is required and repeating Steps 6 through 15;
17. Enabling Path 4-3 of Switch (SW3) (840) if no more iteration is needed and forwarding the signal to the transmitter (890) for transmission.

Figure 9:
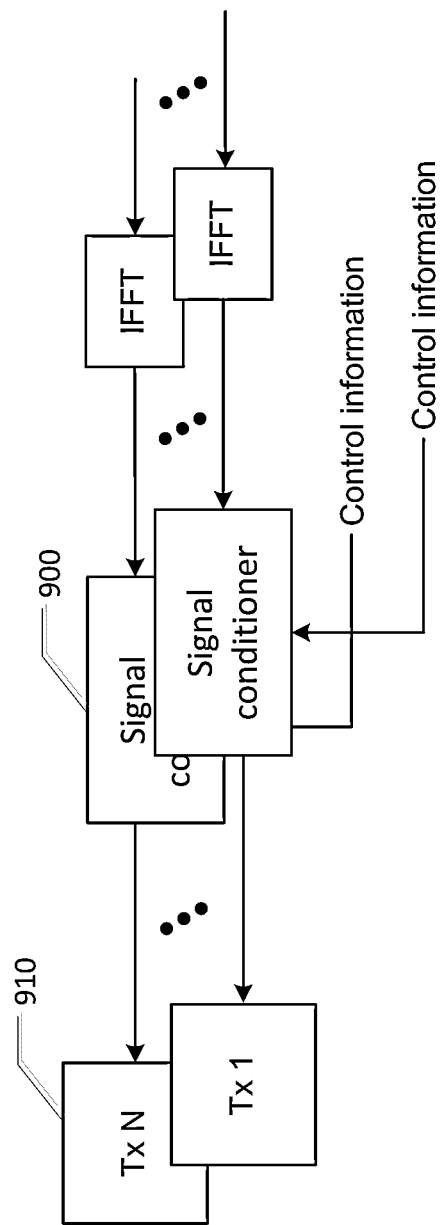
FIG. 9 is a block diagram of using multiple signal conditioners in the case of multiple transmitters.

In other embodiments, in cases where multiple transmitters/antennas are used (e.g., multiple-input-multiple-output (MIMO) or beamforming), multiple signal conditioners may be used. A conditioner 900 may be used in each transmitter 910, as depicted in FIG. 9. A conditioner may be shared by multiple transmitters by time-multiplexing. A conditioner may be integrated with the transmitter. Multiple conditioners may be integrated together.

In more embodiments, the spectral shaping mask can be set to control the level of spectral regrowth for each individual subcarrier such that the effective SNR of this particular subcarrier will not fall below a specified level. The allowable level of spectral regrowth at a subcarrier or subchannel used by the MS may be determined based on the attributes associated with that subcarrier or subchannel, such as,
1. the modulation and coding scheme;
2. the transmission power;
3. the channel condition;
4. the transmission and reception scheme (e.g., receiving diversity at the BS, transmitting diversity at the MS, MIMO, or beamforming at the BS);
5. the information carried by the subcarrier (pilots, ranging signals, control channel information, data, etc.); and/or
6. other system requirements.

The allowable level of spectral regrowth at a subcarrier used by another MS may be determined based on the attributes associated with that subcarrier and that MS, such as,
1. the modulation and coding scheme;
2. the transmission power;
3. the channel condition;
4. the transmission and reception scheme (e.g., receiving diversity at the BS, transmitting diversity at the MS, MIMO, or beamforming at the BS);
5. the information that carried by the subcarrier (pilots, ranging signals, control channel information, data, etc.); and/or
6. the location relative to the BS.

The allowable level of spectral regrowth at a subcarrier used by the system (e.g., pilot subcarriers common to a group or all of the MS's in a cell) may be determined based on the attributes associated with that subcarrier, such as,
1. the modulation and coding scheme;
2. the transmission power;
3. the channel condition; and/or
4. transmission and reception scheme (e.g., receiving diversity at the BS, transmitting diversity at the MS's, MIMO, or beamforming at the BS).

The information for the attributes may be provided by the BS to the transmitting MS explicitly or implicitly, via a header, preamble, a control channel, data message, or any subdivision of frequency-time resource allocated for the transmission of the information. The transmitting MS may also determine the attributes through processing the received signal.

In another embodiment, the spectral shaping mask provided by the MAC or otherwise can vary from one OFDM symbol to the next, from one time slot to the next, or from one time frame to the next.

Figure 10:
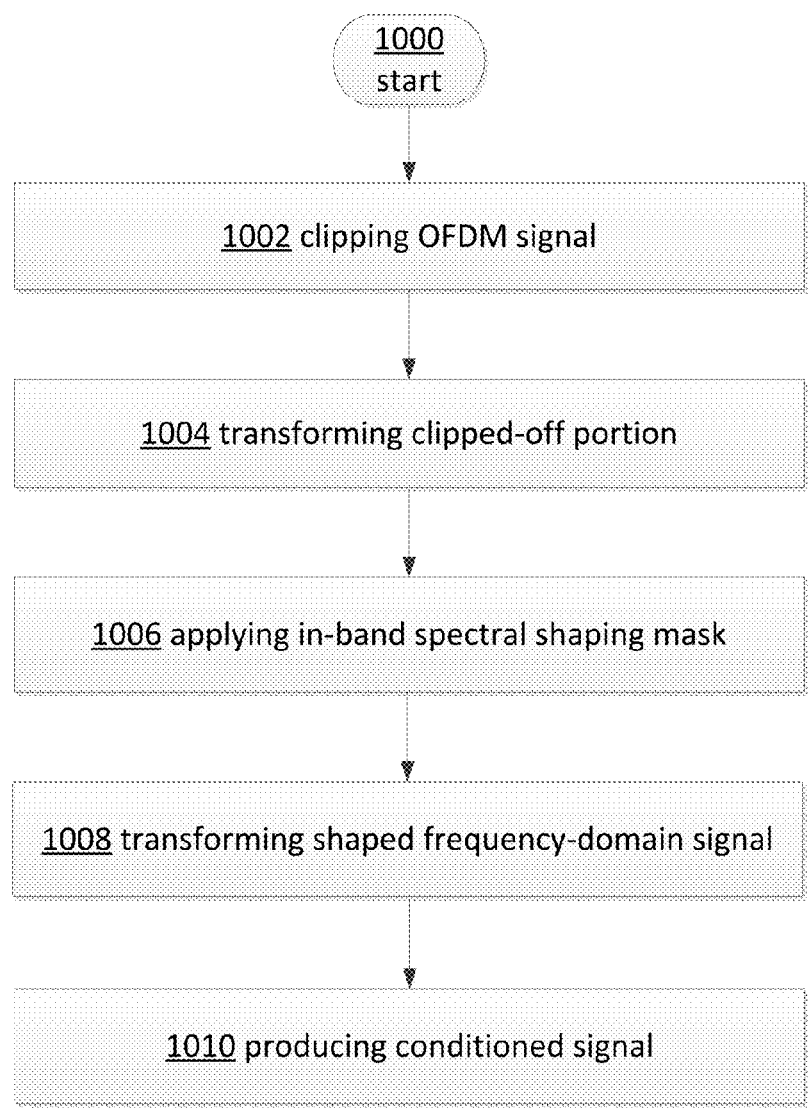
FIG. 10 illustrates an example of an operational procedure for practicing aspects of the present disclosure.

FIG. 10 depicts an exemplary operational procedure for conditioning an orthogonal frequency division multiplex (OFDM) signal including operations 1000, 1002, 1004, 1006, 1008, and 1010. In one embodiment, the procedure may be performed prior to transmission by a transmitter in an orthogonal frequency division multiple access (OFDMA) system operating on a channel with a plurality of subcarriers grouped into subchannels.

Referring to FIG. 10, operation 1000 begins the operational procedure and in operation 1002 the OFDM signal is clipped in the time domain to product a clipped-off portion of said OFDM signal. In one embodiment, the clipping is based on a desired peak-to-average-power ratio (PAPR).

In operation 1004, the clipped-off portion of said OFDM signal is transformed into the frequency domain to produce a frequency-domain signal.

In operation 1006, an in-band spectral shaping mask is applied to individual subcarriers or subchannels of the frequency-domain signal within the channel to control levels of in-band distortion on the individual subcarriers or subchannels. In some embodiments, a different allowable in-band distortion level is allowed for a different subcarrier or subchannel. Additionally and optionally, the allowable in-band distortion level on a subcarrier or subchannel may be determined based on attributes associated with the said subcarrier or subchannel, the attributes comprising:
a modulation and coding scheme (MCS) of said subcarrier or subchannel;
a transmission power level of said subcarrier or subchannel;
a channel condition of said subcarrier or subchannel;
an antenna scheme for transmission or reception on said subcarrier or subchannel;
information carried by said subcarrier or subchannel;
whether said subcarrier or subchannel is used by the transmitter; or
a combination thereof.

In some embodiments, the allowable in-band distortion level is proportional to a robust level of a MCS on a subcarrier or subchannel. The allowable in-band distortion level is correlated with a transmit power level for a subcarrier or subchannel. The allowable in-band distortion level on a subcarrier or subchannel carrying control a signal is lower than the allowable level of in-band distortion on a subcarrier or subchannel carrying data. The allowable level of in-band distortion on a subcarrier or subchannel used by the transmitter to transmit data is lower than the allowable level of in-band distortion on a subcarrier or subchannel not used by the transmitter.

In other embodiments, the in-band spectral shaping mask may vary from OFDM symbol to OFDM symbol, from time slot to time slot, or time frame to time frame.

In operation 1008, the shaped frequency-domain signal is transformed into the time domain to produce a time-domain signal.

In operation 1010, a conditioned signal is produced for transmission by subtracting the time-domain signal from said OFDM signal. In some embodiments, it is determined if an additional iteration of conditioning is required for the conditioned signal. Furthermore, in some embodiments, a transmission mask is applied to out-of-band frequency components of said frequency domain signal.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, methods and systems for communicating in a wireless communications system were disclosed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method for conditioning an orthogonal frequency division multiplex (OFDM) signal prior to transmission by a transmitter in an orthogonal frequency division multiple access (OFDMA) system operating on a channel with a plurality of subcarriers grouped into subchannels, the method comprising:
   clipping said OFDM signal in the time domain to produce a clipped-off portion of said OFDM signal, wherein a time sample of the clipped-off portion of the said OFDM signal is set to zero if a corresponding time sample of the OFDM signal is not greater than a threshold that is based on a desired peak-to-average-power ratio (PAPR);
   transforming said clipped-off portion of said OFDM signal to produce a frequency-domain signal;
   applying an in-band spectral shaping mask to individual subcarriers or subchannels of the frequency-domain signal within the channel to control levels of in-band distortion on the individual subcarriers or subchannels, wherein a different in-band distortion level is allowed for a different subcarrier or subchannel;
   transforming the shaped frequency-domain signal to produce a time-domain signal; and
   producing a conditioned signal for transmission by subtracting the time-domain signal from said OFDM signal.

2. The method of claim 1, further comprising determining if an additional iteration of conditioning is required for the conditioned signal.

3. The method of claim 1, wherein the allowable in-band distortion level on a subcarrier or subchannel is determined based on attributes associated with the said subcarrier or subchannel, the attributes comprising:
   a modulation and coding scheme (MCS) of said subcarrier or subchannel;
   a transmission power level of said subcarrier or subchannel
   a channel condition of said subcarrier or subchannel
   an antenna scheme for transmission or reception on said subcarrier or subchannel;
   information carried by said subcarrier or subchannel;
   whether said subcarrier or subchannel is used by the transmitter; or
   a combination thereof.

4. The method of claim 3, wherein the allowable in-band distortion level is proportional to a robust level of MCS on the subcarrier or subchannel.

5. The method of claim 3, wherein the allowable in-band distortion level is correlated with the transmission power level of the subcarrier or subchannel.

6. The method of claim 3, wherein the allowable in-band distortion level on a subcarrier or subchannel carrying control a signal is lower than the allowable level of in-band distortion on a subcarrier or subchannel carrying data.

7. The method of claim 3, wherein the allowable level of in-band distortion on a subcarrier or subchannel used by the transmitter to transmit data is lower than the allowable level of in-band distortion on a subcarrier or subchannel not used by the transmitter.

8. The method of claim 1, wherein the in-band spectral shaping mask varies from OFDM symbol to OFDM symbol, from time slot to time slot, or time frame to time frame.

9. The method of claim 1, further comprising applying a transmission mask to out-of-band frequency components of said frequency domain signal.

10. A signal generator for generating an orthogonal frequency division multiplex (OFDM) signal at a transmitter in an orthogonal frequency division multiple access (OFDMA) system operating on a channel with a plurality of subcarriers grouped into subchannels, the signal generator comprising:
    means for generating an OFDM symbol in the time domain;
    means for clipping said OFDM symbol to produce a clipped-off portion of said OFDM symbol, wherein a time sample of the clipped-off portion of the said OFDM signal is set to zero if a corresponding time sample of the OFDM signal is not greater than a threshold, the threshold based on a desired peak-to-average-power ratio (PAPR);
    means for transforming said clipped-off portion of said OFDM symbol to produce a frequency-domain signal;
    means for applying spectral shaping mask to individual subcarriers or subchannels of the frequency-domain signal within the channel to control levels of in-band distortion on the individual subcarriers or subchannels, wherein a different distortion level is allowed for a different subcarrier or subchannel;
    means for transforming the shaped frequency-domain signal to produce a time-domain; and
    means for producing a conditioned signal for transmission by subtracting the time-domain signal from said OFDM symbol.

11. The signal generator of claim 10, further comprising means for determining if an additional iteration of conditioning is required for the conditioned signal.

12. The signal generator of claim 10, further comprising means for buffering a signal.

13. The signal generator of claim 10, further comprising means for switching a signal.

14. The signal generator of claim 10, wherein the allowable in-band distortion level on a subcarrier or subchannel is determined based on attributes associated with said subcarrier or subchannel, the attributes comprising:
    a modulation and coding scheme (MCS) of said subcarrier or subchannel;
    a transmission power level of said subcarrier or subchannel
    a channel condition of said subcarrier or subchannel
    an antenna scheme for transmission or reception on said subcarrier or subchannel;
    information carried by said subcarrier or subchannel;
    whether said subcarrier or subchannel is used by the transmitter; or
    a combination thereof.

15. The signal generator of claim 14, wherein the allowable in-band distortion level is proportional to a robust level of MCS on a subcarrier or subchannel.

16. The signal generator of claim 14, wherein the allowable in-band distortion level is correlated with the transmission power level for the subcarrier or subchannel.

17. The signal generator of claim 14, wherein the allowable in-band distortion level on a subcarrier or subchannel carrying control a signal is lower than the allowable level of in-band distortion on a subcarrier or subchannel carrying data.

18. The signal generator of claim 14, wherein the allowable in-band distortion level on a subcarrier or subchannel used by the transmitter to transmit data is lower than the allowable level of in-band distortion on a subcarrier or subchannel not used by the transmitter.

19. The signal generator of claim 10, wherein the in-band spectral shaping mask varies from OFDM symbol to OFDM symbol, from time slot to time slot, or time frame to time frame.

20. The signal generator of claim 10, further comprising means for applying a transmission mask to out-of-band frequency components of said frequency domain signal.

21. A non-transitory computer readable storage medium storing thereon computer executable instructions for conditioning an orthogonal frequency division multiplex (OFDM) signal prior to transmission by a transmitter in an orthogonal frequency division multiple access (OFDMA) system operating on a channel with a plurality of subcarriers grouped into subchannels, the computer readable storage medium comprising:

instructions for clipping said OFDM signal in a time domain to produce a clipped-off portion of said OFDM signal, wherein a time sample of the clipped-off portion of the said OFDM signal is set to zero if a corresponding time sample of the OFDM signal is not greater than a threshold based on a desired peak-to-average-power ratio (PAPR);

instructions for transforming said clipped-off portion of said OFDM signal to produce a frequency-domain signal;

instructions for applying an in-band spectral shaping mask to individual subcarriers or subchannels of the frequency-domain signal within the channel to control levels of in-band distortion on the individual subcarriers or subchannels, wherein a different distortion level is allowed for a different subcarrier or subchannel;

instructions for transforming the shaped frequency-domain signal to produce a time-domain signal; and instructions for producing a conditioned signal for transmission by subtracting the time-domain signal from said OFDM signal.

22. The computer readable storage medium of claim 21, wherein an allowable in-band distortion level on a subcarrier or subchannel is determined based on attributes associated with the said subcarrier or subchannel, the attributes comprising:

a modulation and coding scheme (MCS) of said subcarrier or subchannel;

a transmission power level of said subcarrier or subchannel a channel condition of said subcarrier or subchannel an antenna scheme for transmission or reception on said subcarrier or subchannel;

information carried by said subcarrier or subchannel;

whether said subcarrier or subchannel is used by the transmitter; or a combination thereof.

23. The computer readable storage medium of claim 21, wherein the in-band spectral shaping mask varies from OFDM symbol to OFDM symbol, from time slot to time slot, or time frame to time frame.

\* \* \* \* \*